United States Patent [19]
Bisch

[11] Patent Number: 5,581,868
[45] Date of Patent: Dec. 10, 1996

[54] METHOD AND APPARATUS FOR CONSTRUCTING A METAL PICKET FENCE

[76] Inventor: Robert M. Bisch, 8280 Clairmont Mesa Blvd., San Diego, Calif. 92111

[21] Appl. No.: 345,203

[22] Filed: Nov. 25, 1994

Related U.S. Application Data

[63] Continuation-in-part of Ser. No. 269,142, Jun. 30, 1994, abandoned.

[51] Int. Cl.$^6$ ................................................ E04H 17/14
[52] U.S. Cl. ........................ 29/525.08; 256/22; 256/65; 403/252; 403/263; 403/353
[58] Field of Search .......................... 29/525.01, 525.08; 256/21, 22, 34, 47, 65, 70; 403/252, 263, 353

[56] References Cited

U.S. PATENT DOCUMENTS

| | | | |
|---|---|---|---|
| 1,686,583 | 10/1928 | Templeton | 29/525.08 X |
| 2,808,233 | 10/1957 | Spescha | 256/22 |
| 3,180,663 | 4/1965 | Lehmann | 29/525.08 X |
| 3,822,053 | 7/1974 | Daily | 256/65 X |
| 4,667,935 | 5/1987 | Moore | 256/22 |

*Primary Examiner*—Joseph M. Gorski
*Attorney, Agent, or Firm*—John R. Duncan; Frank D. Gilliam

[57] ABSTRACT

A method of constructing metal picket fences and components for use in building fences. Basically, panels are constructed by punching holes in frame tubes with a pyramidal punch to form holes with inwardly extending metal tabs. Pickets are pressed into the holes to form fence panels that are fastened to posts. An angled, self-locking pin system is provided to lock picket ends in frame tube holes to prevent the pickets from being removed. Straps can be fastened to the posts with fence panels fastened to the straps in a manner permitting accommodation of inter-post tolerances and ground slope changes. Blind fasteners can be used to fasten the straps to the posts and panels so that the fasteners cannot be easily removed. Several different embodiments of blind fasteners and post or surface mounting brackets are described.

15 Claims, 3 Drawing Sheets

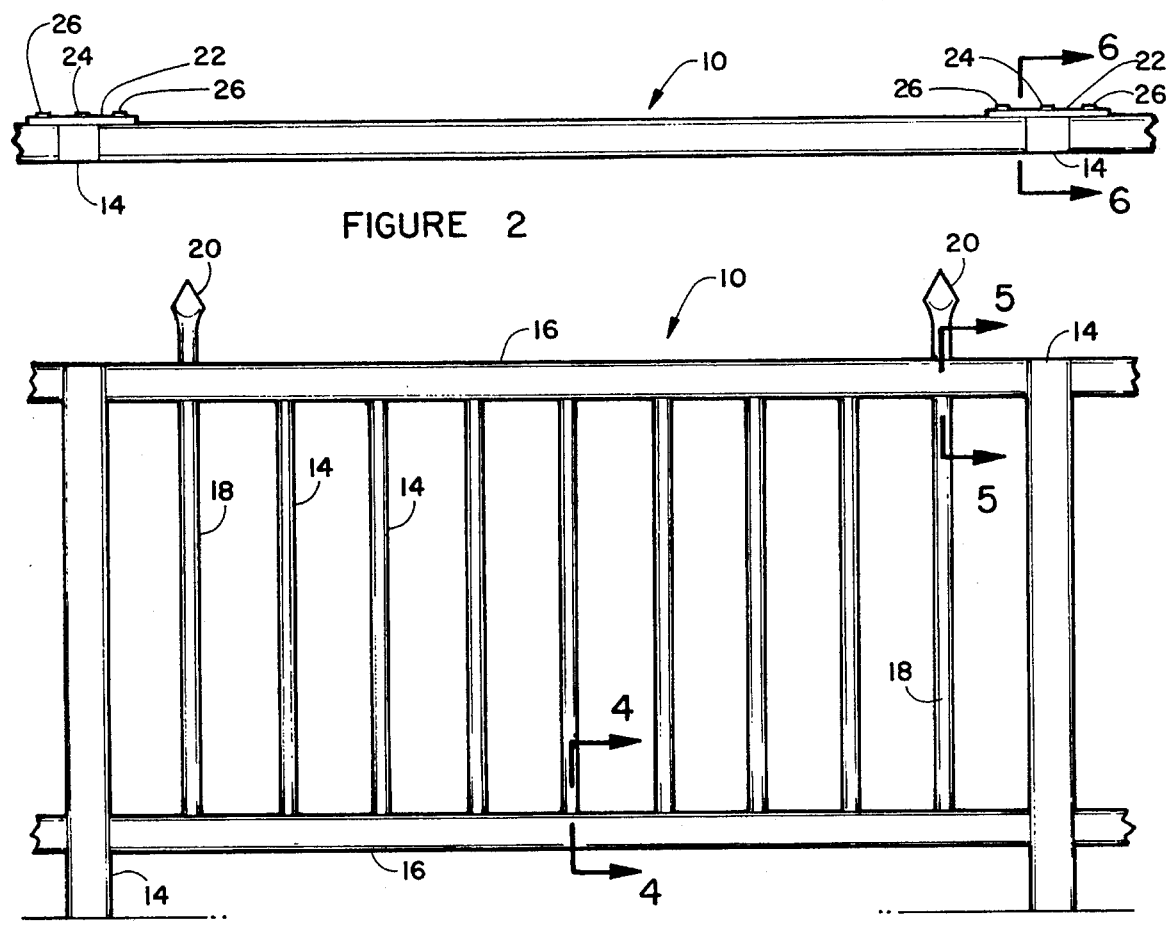
FIGURE 2
FIGURE 1
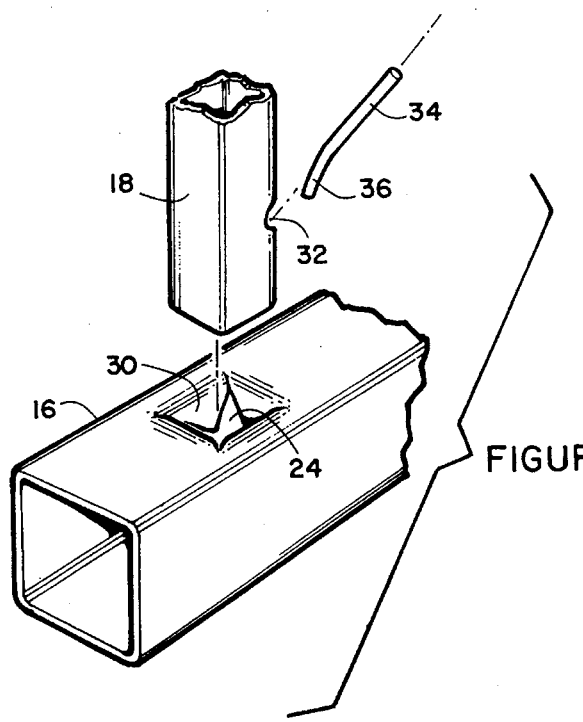
FIGURE 3
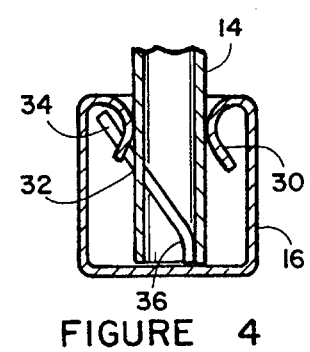
FIGURE 4
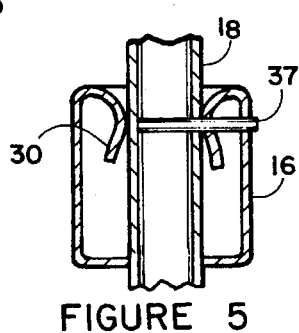
FIGURE 5

5,581,868

METHOD AND APPARATUS FOR CONSTRUCTING A METAL PICKET FENCE

This is a continuation-in-part of application Ser. No. 08/269,142 filed on Jun. 30, 1994 and now abandoned.

BACKGROUND OF THE INVENTION

This invention relates in general to metal picket fences and, more specifically, to a method and apparatus for assembling a strong, rigid metal picket fence from pre-formed components.

A wide variety of metal picket fences have been made in the past. Generally, a number of vertical pickets, which may be rods or tubes of metal, are welded to upper and lower cross pieces to form panels. The panels are then fastened to posts, generally by welding where metal posts are used or bolted or screwed fittings where posts of other material are used or where the panel is to be installed over a window or the like. While sturdy, these fences have a number of problems. The welded areas are prone to rusting, even if painted. Where galvanized components are used, welding will destroy the coating at the weld areas, leading to rusting. Since these panels are generally assembled and welded at a factory, panels cannot be varied in size or to accommodate irregular ground surfaces. Welding the panels on site requires complex and heavy jigs and fixtures and welding equipment. Also, considerable skill and time is required to properly assemble the fence panels and fence on site.

Attempts have been made to design fence panels that can be assembled or adjusted on site. These fences and fence construction methods tend to lack sturdiness and ease of assembly. Miller, in U.S. Pat. No. 1,791,680 describes a joint lock for use in the construction of grill-work for fastening bars to rails and rails to posts. Bos describes in U.S. Pat. No. 3,411,752 a guardrail construction that may be delivered to a site in a knocked-down condition an erected there. U.S. Pat. No. 3,707,276, issued to Fraincis et-al. describes a variety of aluminum rail extrusions for fence construction, with pickets pivoted to the rails by bolts extending through the pickets and top and bottom rails. Each of these fences construction systems suffers from the problems described above.

Thus, there is a continuing need for improved methods and apparatus for constructing metal picket fences that can be conveniently assembled on site from standard components, that provide a sturdy and long lived fence, that can be assembled from galvanized components without damaging or destroying the galvanized coating.

SUMMARY OF THE INVENTION

The above-noted problems, and others, are overcome in accordance with this invention by a method and apparatus which basically comprises preparing a number of pickets and frame tubes, assembling them into fence panels with pickets locked into holes in the frame tubes, adding mounting brackets to the panels and mounting the panels an posts, a wall surface to cover a window, etc.

Preferably, the pickets are metal tubes and the frame tubes are metal tubes with internal diameters greater than the external diameters of the pickets. While any suitable cross sectional shapes may be used, such as rectangular, circular, etc., square tubes are preferred for efficient interconnection and appearance. While usually two frame tubes are used with a plurality of parallel pickets extending between them, or extending beyond one of the frame tubes, more than two frame tubes may be used, if desired, with pickets extending through central frame tubes.

Holes are punched at spaced locations along frame tubes, preferably with a pyramidal punch that folds the metal back from the center of the hole, leaving an opening equal to or slightly less in area than the cross-sectional area of the pickets. Where the ends of the pickets are to stop in top and bottom frame tubes, both the top and bottom frame tubes will be punched in an identical pattern. In some cases, it may be desirable that pickets extend through the top frame tube, typically ending in a spear point or other decorative final. In that case, smooth holes equal in shape to the picket cross section will be punched all the way through. A hole may be drilled transversely through the frame tube and picket and a pin inserted to hold the picket in place. The picket will be fed through the holes in the top frame tube then forced into the one-side hole in the bottom frame tube.

In order to lock a picket end in a frame tube, a pin hole is formed, typically by drilling or punching, in the wall (preferably at the corner of a rectangular tube) at an angle toward the intersection of the opposite picket tube wall and the end of the tube. A pin is placed in the pin hole, substantially flush with the hole. The length of the pin is sufficient to extend slightly beyond the picket tube end. When the picket is forced into the frame tube, the pin is forced up to extend out of the pin hole when the picket end is seated. The pin end overlaps the edge of the punched hole in the frame tube, preventing withdrawal of the picket. For best results, the end of the pin is bent slightly so as to lie parallel to the picket tube wall. Optimally, about 5 to 20 percent of the pin length is bent at an angle of about 5° to 20°.

Any suitable brackets may be used to fasten the fence panels to posts or other surfaces. A strap may be fastened across a post, preferably with a non-removable blind fastener and fence panels can be fastened to ends of the strap, also preferably with blind fasteners. A particularly desirable blind fastener is described in detail below. If desired, the strap can be recessed into a post by the method detailed below.

For surface mounting fence panels, such as to cover a window, attractive angle brackets may be made by inwardly pinching opposite sides of metal tubes, then bending the tubes transverse to the pinched sides, as detailed below.

BRIEF DESCRIPTION OF THE DRAWING

Details of the invention, and of preferred embodiments thereof, will be further understood upon reference to the drawing, wherein:

FIG. 1 is an elevation of a fence section according to this invention;

FIG. 2 is a plan view of the fence section of FIG. 1;

FIG. 3 is an exploded view of the connection of a picket to a frame tube;

FIG. 4 is a detail section view taken on line 4—4 in FIG. 1;

FIG. 5 is a detail section view taken on line 5—5 in FIG. 1;

DETAILED DESCRIPTION OF PREFERRED EMBODIMENTS

Figure 6:
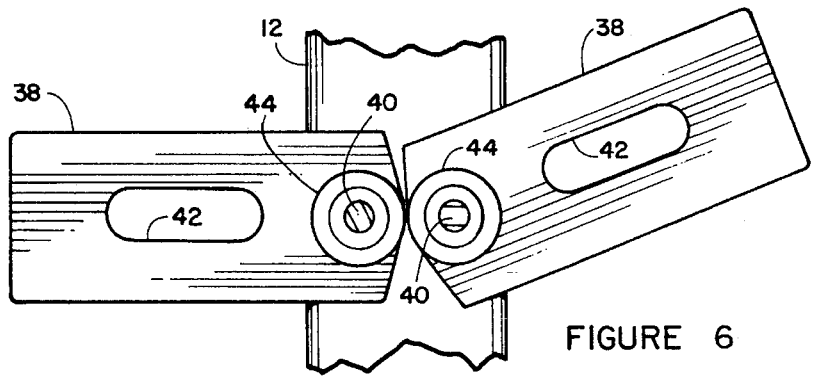
FIG. 6 is a detail elevation view showing one bracket arrangement for mounting fence panels on posts.

Referring to FIGS. 1 and 2, there is seen a fence section including a fence panel 10 and two posts 12. Each fence panel 10 includes a plurality of pickets 14 and frame tubes 16. While most pickets 14 are shown with each end inserted into, and terminating within, a frame tube 16, two through pickets 18 extend through upper frame tube 16 and have decorative finals 20.

Each frame tube 16 is fastened to posts 14 by straps 22 held to posts by fasteners 24 and to frame tubes 16 by fasteners 26. While any suitable fasteners may be used, the blind fasteners and bolts detailed below are preferred for appearance, effectiveness and reduced removability.

As seen in FIG. 3, picket holes 28 are formed in frame tubes 16 by punching with a conventional pyramidal punch. The punch cuts the tube wall in a generally "X" shaped pattern and folds metal tabs 30 downwardly along each side of the hole. Preferably, the tabs form a hole 28 slightly smaller than the cross section of picket 18, but generally conforming thereto in shape. Thus, as picket 18 is forced into hole 24, the walls of the hole tightly and with a spring-like action engage the picket sides.

A locking mechanism, as seen in FIGS. 3 and 4, is provided to retain pickets 18 in holes 24 and prevent withdrawal of the pickets. A pin hole 32 is formed in the wall of picket 18 adjacent to the picket end by any suitable method, such as punching or drilling. Preferably, the pin hole is formed in a corner of a rectangular picket and is angled toward the intersection of the opposite edge and picket end for maximum holding power. A pin 34, preferably a sliding fit, is inserted into pin hole 32. The length of pin 34 is selected so that when pin 34 is inserted flush with pin hole 32, the opposite end extends slightly beyond the end of picket 18. Ideally, pin 34 and pin hole 34 are configured so that the lower end of pin engages the opposite picket wall with sufficient spring force to hold the pin in place.

When picket 18 is forced into hole 34, as seen in FIG. 4, when the picket end bottoms out against the interior wall of frame tube 16, pin 34 will be forced up into the picket end, forcing the other end of the pin out through pin hole 32. This overlaps the edge of hole 24, preventing removal of picket 18. In the optimum configuration, as shown, pin hole 32 is in a corner of a rectangular picket 18 and the pin end 36 is in the opposite corner. Then, when installed, the upper pin end fits between adjacent metal tabs 30 close to the upper wall of frame tube 16. End 36 of pin 32 is preferably bent slightly so that the end lies generally perpendicular to the lower inner wall of frame tube 16 when emplaced to provide the optimum line of installation force. Optimally, the last 5 to 20 percent of the pin is bent from about 5° to 20°. The length of pin 34, pin hole 32 location and precise bend angle will be selected in accordance with the diameters of frame tube 16 and picket 18.

Once a fence panel 10 is assembled, the assembly may be adjusted to match sloping ground, etc, by simply moving upper frame tube 16 longitudinally relative to the other frame tube, "parallelograming" the panel. Such a panel can be mounted between parallel vertical posts on sloping ground.

Where a picket 18 extends through a frame tube 16, as seen in FIG. 5, in order to secure the t=picket and tube together, preferably a pin 37 is installed in a hole drilled perpendicular to the surface of frame tube 16 and one side of picket 18. If pin 37 is installed in a hole drilled through both the outer wall of frame tube 16 and a tab 30, the pin will be resistant to movement of picket 18. If desired, the pin could extend through the second side of picket 18 and a second tab 30.

The fence panels as detailed in FIG. 1–5 can be installed on posts, surfaces, etc, using any suitable brackets. However, certain preferred brackets, providing optimum strength, adjustability and appearance, are detailed in FIGS. 6–12.

FIG. 6 shows a post 12 having two straps 38 fastened thereto by blind fasteners 40. Elongated openings 42 in straps 38 are provided through which fasteners may be inserted into ends of frame tubes 16 in panels 10. Blind fasteners 40 may be used to fasten straps 38 to frame tubes 16 through elongated openings 42. Preferably, washers 44 are provided with fasteners 40 to allow the straps 38 to swivel slightly. The abutting edges 46 are curved to allow independent swiveling of each strap 38. Straps 38 and elongated holes 42 thus can accommodate a change from level to sloping ground and some irregularity in the spacing of posts 12.

Figure 7:
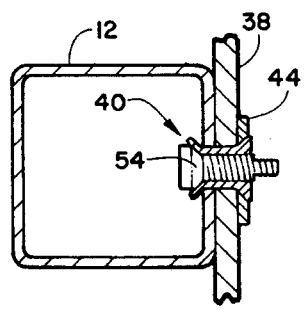
FIG. 7 is a section view through a novel blind fastener taken on line 7—7 in FIG. 9.
Figure 8:
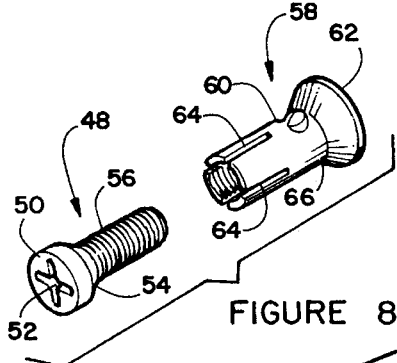
FIG. 8 is an exploded view of the blind fastener of FIG. 7, having a first rotation preventing means.

FIGS. 7 and 8 illustrate one embodiment of a novel blind fastener particularly adapted for use in the fence system. Each blind fastener 40 comprises a bolt 48 having an enlarged head 50 and a means, such as Phillips head screwdriver slots 52, for turning the bolt. A frusto-conical transition 54 is provided between enlarged head 50 and threaded shaft 56. A sleeve 58 has a cylindrical tubular body 60, internally threaded to receive bolt 48. An enlarged frusto-conical head 62 is provided at one end of sleeve 58. The second end of sleeve 58 includes at least one longitudinal slot 64.

Where blind fastener 40 is to be placed in an elongated slot such as slot 42 or a round hole, it is preferred that sleeve 58 not rotate while bolt 48 is threaded thereinto. In the embodiment of FIG. 8, a small amount of metal is "pinched in a conventional press type device, to raise a metal tab 66. Tab will bind against a side of elongated slot 42 and prevent rotation. A small tab 66 can be used with a round hole to cause greatly increase friction and reduce turning of sleeve 58. The end of threaded shaft 56 is ground on two sides to form a thin, flat, extension 68.

The blind fastener 40 is installed by inserting bolt 68 from one side and sleeve 58 from the other side. Shaft 56 is threaded into the internal threads in sleeve 58.When conical transition 54 reaches the edge of sleeve body 60, extension 68 projects beyond sleeve head 62. Slots 52 are engaged with a screwdriver and turned to fully seat bolt 48 in sleeve 58, spreading the sleeve end as seen in FIG. 7.

Figure 9:
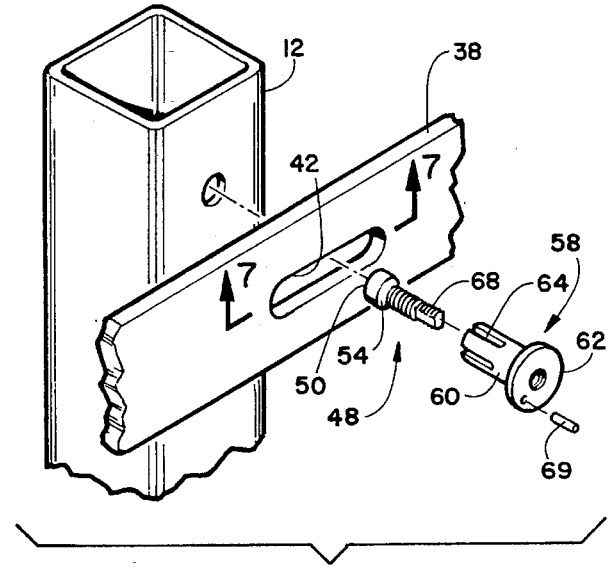
FIG. 9 is an exploded perspective view showing installation of a blind fastener having a second rotation preventing means.

FIG. 9 shows an alternate embodiment of the blind fastener of FIG. 8. Here bolt 48 is generally the same as in FIG. 8, except that the threaded shaft 56 is longer and the end is ground on opposite sides to form a flat extension 68. As bolt 48 is threaded into sleeve 58, extension 68 protrudes through sleeve head 62 and can be gripped with a conventional wrench to fully seat the bolt in the sleeve, to the point shown in FIG. 7. Further torque on extension 68 will snap the extension off, leaving a smooth surface and a fastener that cannot easily be removed. In order to prevent rotation of sleeve 58 during rotation of bolt 48, a pin 69 is installed through head 62 so that the end of the pin extends into slot 42 adjacent to sleeve body 60 and binds against the edge of the slot.

Figure 10:
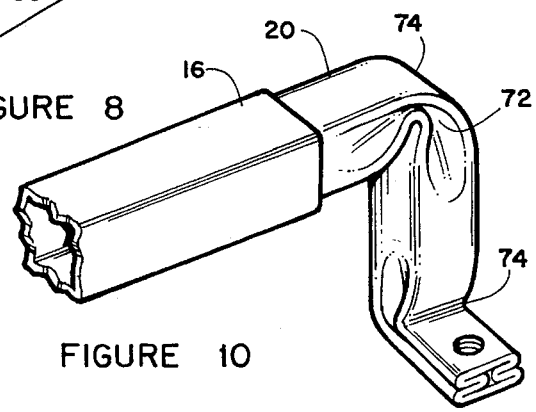
FIG. 10 is a perspective view showing a bracket for mounting a fence panel on a parallel surface.
Figure 12:
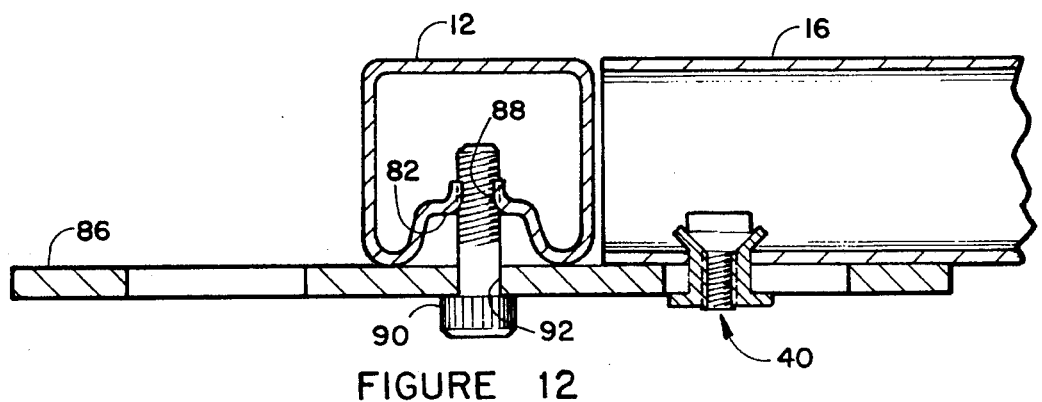
FIG. 12 is a section view taken on line 12—12 in FIG. 1 with a further blind fastener installed.
Figure 11:
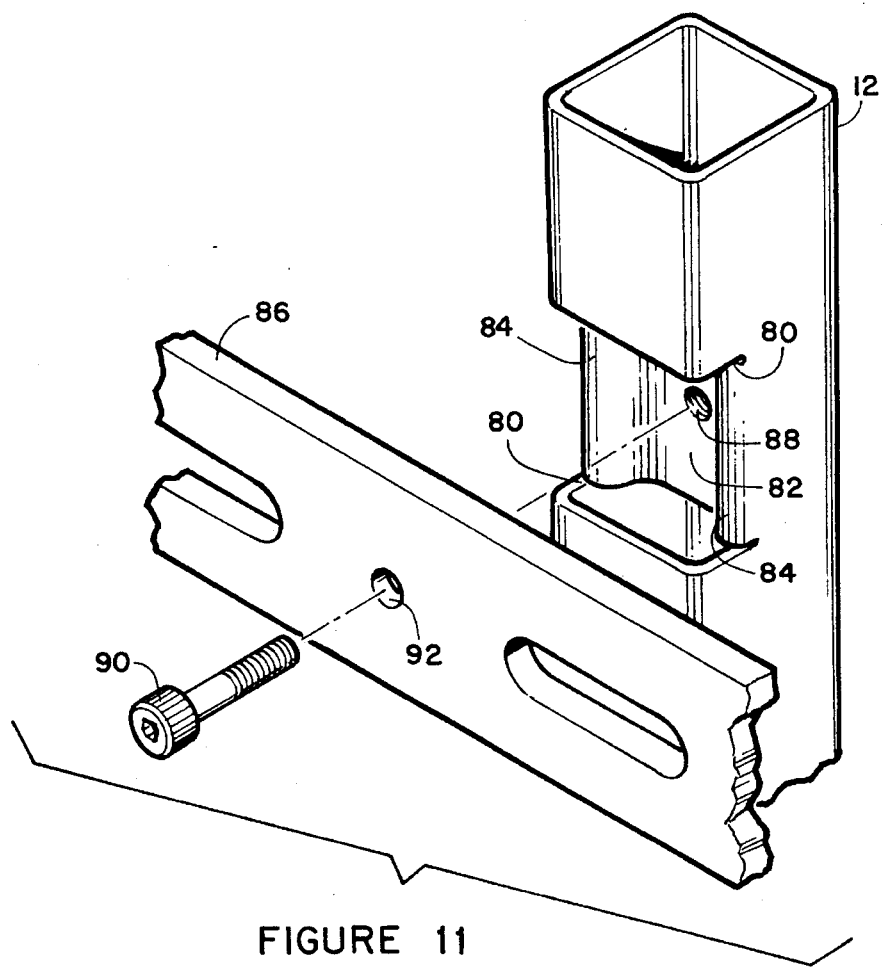
FIG. 11 is an exploded perspective view showing installation of a fence panel mounting strap recessed into a post.

A bracket for use in mounting a fence panel over a surface, such as a window, is illustrated in FIG. 10, A piece of tubing 70 having an external diameter such as to slide into a frame tube 16 is pressed between two blade-shaped members to indent those sides to form opposing indentations 72. Tube 70 can then easily be bent transverse to those indentations into a smoothly curved bend 74. The sides that were not indented are then indented so that a bend at about 90° to the first bend 74 can be formed. The tube bend is then pressed to form a thin, flat end 76. A hole 78 is formed in end 76 for a fastener such as a screw or bolt.

Where the interior of a post 12 cannot be accessed to use a blind fastener, the fastening technique shown in FIGS. 11 and 12 is preferred. Two spaced slots 80 are cut transverse to post 12 as seen in FIG. 11. A punch with a flat, rectangular end is used to punch the material between slots 80 to form a flat recessed surface 82. The punch distance is selected to provide edges 84 a predetermined distance beneath the surface of post 12, generally equal to the thickness of the strap 86 to be used.

A second punch, typically a round, pointed punch, is used to punch the center of recess 82 to form a short tubular opening 88 which is then threaded with a conventional tap. If necessary, opening 88 can be reamed in a conventional manner prior to taping.

A strap 86, preferably having a width and thickness such that the strap will fit between slots 80, flush with the surface of post 12. Any suitable bolt 90 is installed through a hole 92 in strap 86 and threaded into opening 88. A fence panel frame tube 16 can then be secured to strap 86 by a blind fastener 40 as seen in FIG. 12 and described above. In many cases, a one-way bolt head may be preferred on bolt 90 to allow the bolt to be threaded into hole 88 but prevent removal, or a bolt with a snap off head portion may be used.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A method of assembling a fence panel which comprises the steps of:

providing a plurality of tubular metal pickets each having a selected cross sectional configuration and interior and exterior walls;

providing two frame tubes each having a cross section greater than that of said pickets;

forming spaced picket holes along one surface of each frame tube, said picket holes having cross sections corresponding to, but smaller than, cross sections of said pickets;

forming a pin hole adjacent to at least a first end of each picket, said pin hole having an axis along a line extending toward an intersection of an opposite interior wall and said first end of said picket;

installing a metal pin having a first end portion and a second end portion bent at an angle to the remainder of the pin into each of said pin holes, extending diagonally from said pin hole toward said intersection with said first end portion in frictional contact with a portion of said picket defining said pin hole and with said bent portion of the pin in frictional contact with said opposite interior wall of said picket, thereby releasably holding said pin in place with a portion of said bent end portion extending beyond said first end of said picket; and forcing said first picket ends into said picket holes, thereby contacting said pins with an internal frame tube surface, and thereby forcing said portion of said bent end portion back into said picket, such that the first end portion of said pin projects out of said pin hole and beneath said one surface;

whereby withdrawal of said pickets from said picket holes is prevented by engagement of said first end portion with its respective frame tube.

2. The method according to claim 1 wherein said picket and frame tubes have rectangular cross sections and said pin hole is formed in a first corner of said picket and oriented toward an intersection of an opposite corner and said first end.

3. The method according to claim 1 wherein said picket holes are formed by punching with a pyramidal punch to form metal tabs extending into said picket holes.

4. The method according to claim 1 including the steps of bending a first end of said pin to an angle about 5° to 20° about 5 to 20 per cent of pin length from said first pin end and installing said pin with said pin end adjacent to said first picket end and said first pin end lying approximately parallel to said picket.

5. The method according to claim 1 wherein a pin is installed at only said first end of a picket and including the steps of forming aligned first and second picket holes entirely through a second frame tube and forcing said picket entirely through said second frame, whereby said first picket end is secured in said first frame tube and said picket extends entirely through said second frame tube.

6. The method according to claim 5 further including the steps of:

forming said first hole in said second frame by punching with a pyramidal punch to force metal tabs into said frame;

forming a transverse pin hole through a side of said second frame tube, one of said metal tabs and at least one side of said picket; and installing a transverse pin in said hole, whereby said picket is secured to said second frame tube.

7. The method according to claim 1 further including fastening a strap to each end of said frame tubes, said straps extending beyond ends of said frame tubes for fastening to fence posts.

8. The method according to claim 7 further including the steps of fastening at least some of said straps to said frame tubes and to fence posts with blind fasteners.

9. The method according to claim 8 further including the steps of:

providing a mounting tube having a configuration allowing said mounting tube to slip into ends of said frame tubes;

indenting opposite sides of said mounting tube at at least one location;

bending said mounting tube at indented locations;

flattening a first end of said mounting tube;

securing a second end of said mounting tube in a frame tube end; and fastening said flattened first mounting tube end to a support structure.

10. A method of locking a tubular picket to a tubular frame member which comprises the steps of:

providing a tubular picket having an exterior and an interior wall and a tubular frame member having a larger cross section than that of said picket;

forming a picket hole in a frame wall of said tubular frame member, with a cross section substantially conforming in shape to the picket cross section but less in area;

forming a pin hole through said exterior and interior walls of said picket, said pin hole spaced from a first picket end;

inserting a pin having a first end portion and a second end portion bent at an angle to the remainder of said pin into said pin hole with said first pin end in frictional engagement with a portion of said picket defining said pin hole and said second pin end bent portion in frictional contact with a portion of said interior wall opposite said pin hole and with a portion of said second bent end portion extending beyond said first picket end adjacent to said portion of said interior wall opposite said pin hole;

retaining said pin in said pin hole by said frictional engagement between said pin and said portion of said picket defining said pin hole and said frictional contact between said bend end portion and said interior wall portion; and forcing said first picket end into said picket hole, thereby contacting said second end of said pin with an interior wall of said frame member opposite said frame wall and thereby causing said first pin end portion to project out of said hole and beneath said frame wall.

11. The method according to claim 10 wherein said picket and frame tubes have rectangular cross sections and said pin hole is formed in a first corner of said picket and oriented toward an intersection of an opposite corner and said first end.

12. The method according to claim 11 including the steps of bending a first end of said pin to an angle about 5° to 20° about 5 to 20 per cent of pin length from said first pin end and installing said pin with said pin end adjacent to said first picket end and said first pin end lying approximately parallel to said picket.

13. A method of securing a smaller diameter tube to a larger diameter tube which comprises:

forming a pin hole adjacent to at least a first end of said smaller diameter tube, said pin hole having an axis along a line extending toward an intersection of an opposite tube interior wall and said first end portion of said smaller diameter tube;

installing a metal pin having a first end portion bent at an angle to the remainder of said pin in said pin hole, with said first, bent, end portion in frictional contact with said interior wall opposite said pin hole and having a second pin end in frictional contact with a portion of said small diameter tube defining said pin hole and substantially flush with said pin hole with said pin extending diagonally toward said intersection, a portion of said first bent end portion extending beyond said first end of said smaller diameter tube and in frictional retaining engagement with said interior wall of said smaller diameter tube; and forcing said smaller diameter tube end into a hole in a first wall of said larger diameter tube until said pin contacts an interior wall of said larger diameter tube opposite said first wall, thereby forcing said bent end portion back into said smaller diameter tube such that the second end portion of said pin projects out of said hole and beneath said first wall.

14. The method according to claim 13 wherein said picket and frame tubes have rectangular cross sections and said pin hole is formed in a first corner of said picket and oriented toward an intersection of an opposite corner and said first end.

15. The method according to claim 14 including the steps of bending a first end of said pin to an angle about 5° to 20° about 5 to 20 per cent of pin length from said first pin end and installing said pin with said pin end adjacent to said first picket end and said first pin end lying approximately parallel to said picket.

* * * * *